March 21, 1939.　　　H. THOMA　　　2,150,950
POWER TRANSMISSION MECHANISM
Filed May 11, 1935　　　8 Sheets-Sheet 1

Fig. 1.

INVENTOR
HANS THOMA
BY
ATTORNEY

March 21, 1939.  H. THOMA  2,150,950
POWER TRANSMISSION MECHANISM
Filed May 11, 1935  8 Sheets-Sheet 3

INVENTOR
HANS THOMA
BY
ATTORNEY

March 21, 1939. H. THOMA 2,150,950
POWER TRANSMISSION MECHANISM
Filed May 11, 1935 8 Sheets-Sheet 4

INVENTOR
HANS THOMA
BY
ATTORNEY

March 21, 1939. H. THOMA 2,150,950
POWER TRANSMISSION MECHANISM
Filed May 11, 1935 8 Sheets-Sheet 5

INVENTOR
HANS THOMA
BY A. A. Klicke
ATTORNEY

Patented Mar. 21, 1939

2,150,950

UNITED STATES PATENT OFFICE 2,150,950

POWER TRANSMISSION MECHANISM

Hans Thoma, Karlsruhe, Germany

Application May 11, 1935, Serial No. 21,001
In Germany April 6, 1934

10 Claims. (Cl. 74—262)

This invention relates to power transmission mechanisms and particularly to hydraulically controlled variable speed transmissions.

One of the objects of the invention is to provide novel and efficient means for changing the ratio between the speed of revolution of a driving or power input member and that of a driven or power output member.

Another object of the invention is to provide hydraulically actuated means for effecting changes in the speed and power ratio between the power input and output shafts of a device.

A further object of the invention is to provide hydraulic means including a valve member for selectively varying the speed and power ratio between input and output shafts.

Another object of the invention is to provide a device providing four forward speeds and a reverse by means of a variably controlled planetary or epicyclic train of gears interposed between a driving member and a driven member.

In accordance with one form of the invention a novel form of clutching mechanism is provided which is smooth and yet effective in its action and therefore another object of the invention is to provide a novel type of clutch mechanism which while adapted for use in the present invention is capable of universal application.

These and other objects and features of the invention will appear from the following description of one embodiment thereof which has been chosen for the purpose of illustrating the principles of the invention.

Figure 1:
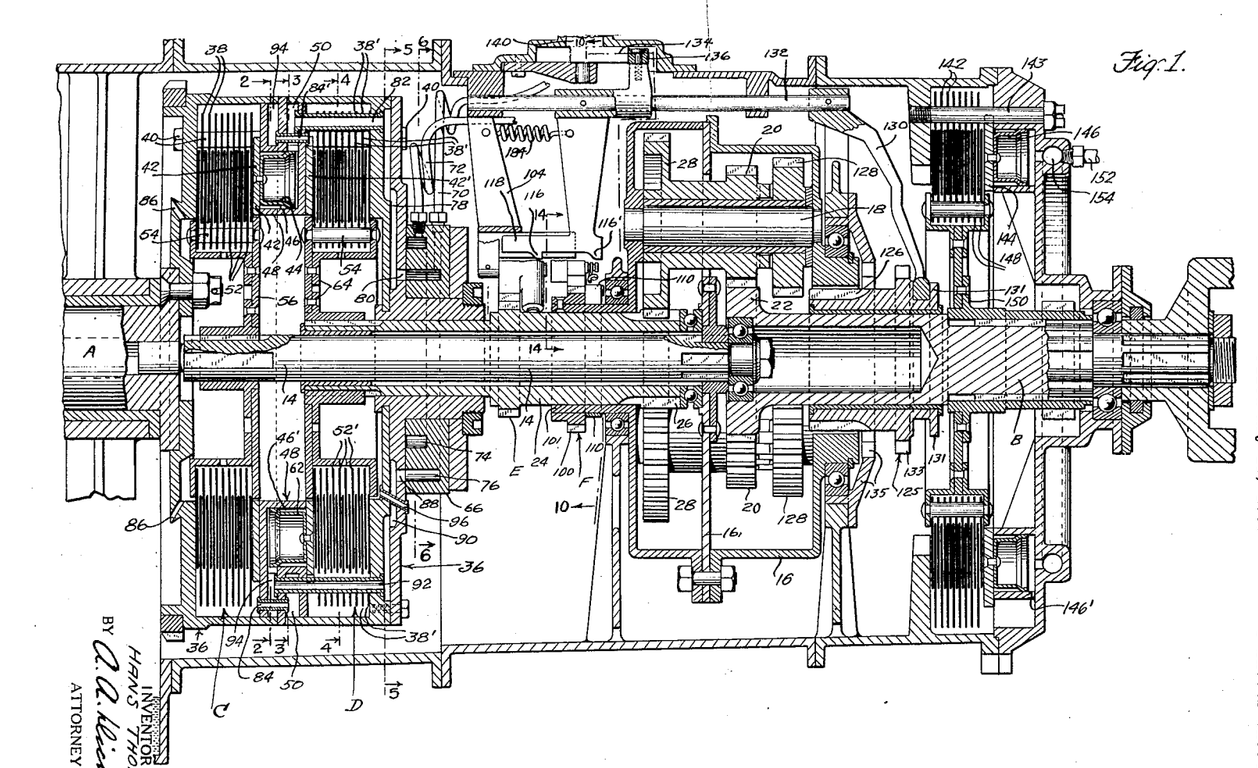
Fig. 1 is a vertical sectional view through a typical form of transmission mechanism in which the present invention is embodied.

In that form of the invention illustrated in the drawings and hereinafter described there is a driving member such as the power input shaft A on the left hand side of Fig. 1 which may be connected to an internal combustion engine, steam engine, motor, turbine, or any other device from which power is to be taken. The driven member may be any desired element or mechanism for receiving power and as shown at the right hand side of Fig. 1 is in the form of a power output shaft B. An intermediate clutch controlled shaft 14 is positioned between the input shaft A and the output shaft B and is provided with a housing 16, driven thereby as by web 16₁, within which housing is located a cluster of planetary or epicyclic gears mounted on shafts 18, the ends of which are supported by the housing. The gears 20 of said cluster engage with a gear 22 on the output shaft B and serve to transmit power for driving the shaft in either a forward or reverse direction. In the following description the term "forward" is used in referring to rotation in a clockwise direction as seen from the left hand side of Fig. 1, whereas the term "reverse" is used in referring to rotation in a counter-clockwise direction as seen from the left of Fig. 1.

A tubular clutch controlled shaft 24 loosely surrounds the intermediate shaft 14 and is formed at its right hand end with a gear 26 meshing with a gear 28 formed integral with or secured to the gear 20.

Clutch mechanism is provided at the left hand end of each of the shafts 14 and 24 by means of which either or both shafts may be caused to rotate with the power input shaft A by suitable selective operations. While any suitable form of clutch mechanism may be employed for this purpose, I prefer to use two separate clutch constructions of a novel type and which are preferably hydraulically controlled.

Attempts made heretofore to produce a clutch (or brake mechanism) comprising relatively movable members whereby torque is transmitted from one member to the other initially purely as shear stresses in a fluid such as oil have not met with success. The difficulty has been that when the members have been moved apart for disengaging the clutch, a considerable amount of torque was transmitted by the oil particularly at high relative speeds, resulting in a creeping of the driven shaft. When the clutch area was reduced or a much thinner fluid used to overcome this difficulty the smooth gradual engagement possible of accomplishment through taking advantage of shear stresses in an oil film were not secured but, instead, a rather harsh, sudden, clutch action resulted, particularly as such surfaces cannot be formed with the necessary accuracy.

To overcome these difficulties the present invention involves means for providing a supply of oil between the clutch elements at the time when the clutch is to be engaged and to provide for the draining away of said oil when the clutch members are disengaged. Furthermore, oil from the same source may be conveniently used to actuate the movement toward and from each other of the said clutch members. This construction provides a clutch (or brake) having a very smooth action and which at the same time is free from creep when disengaged.

Such a clutch mechanism is shown in detail in Figs. 1, and 4-9 inclusive, and since the same construction is used in each of the clutches C and D which serve to connect the input shaft A with the intermediate shaft 14 and tubular shaft 24, respectively, only one of these clutches is described in detail. As shown, the clutch is located within a housing 36 carried by the input shaft A and rotatable therewith. A series of annular plates 38 are loosely spaced and arranged upon bolts 40 secured to the housing 36. The ring 42 adjacent plates 38 is provided with pistons 44 located on the opposite side of the ring and within chambers 46 formed in a recessed ring-shaped frame 48 rotatable with and extending inwardly from the housing 36. The plates 38 are rotatable with the housing and input shaft but are movable axially with respect thereto by means of the pistons 44 under the action of fluid supply to the chambers 46 through annular channel 50 in the frame 48.

A similar series of plates 52 is loosely secured by bolts 54 carried by a web or spider 56 keyed to the intermediate shaft 14. The plates 52 are located between the plates 38 and overlap the plates 38 throughout a portion of their area. Slots 58 (see Fig. 4) extend radially in the overlapping portions of one of said sets of plates, such as plates 52, and are preferably formed with beveled or inclined faces 60 adjacent the edges of the slots. These beveled faces are shown greatly exaggerated in Figs. 4 and 9. On relative rotation of the plates the beveled edges serve to draw oil or other liquid or fluid employed (due to its viscosity) into the spaces between the surfaces thereof so that these surfaces are lubricated and a cushioning film of oil is present between the same prior to actual engagement of the plates which serves through shear stresses to produce a smooth gradual clutch application. However, the application of suitable pressure to the pistons 44 serves to gradually force the plates 38 into direct contact with the plates 52 whereby the shaft 14 is caused to rotate with the power input shaft A.

The clutch D between the gear operating shaft 24 and the housing 36 is of a like construction and is actuated by pistons 62 shown in the lower portion of Fig. 1 for forcing the plates 38' of the clutch to the right into engagement with the plates 52' carried by the web 64 secured to the gear operating shaft 24.

Figure 2:
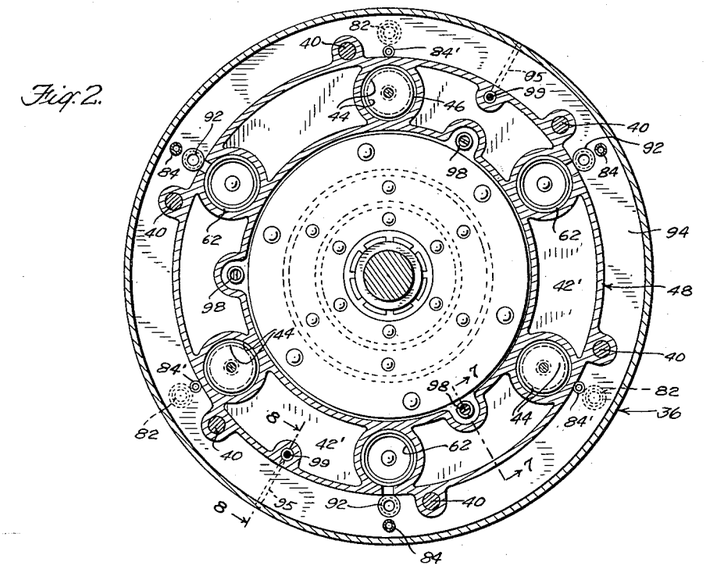
Figs. 2, 3, 4, 5 and 6 are transverse sectional views of the construction illustrated in Fig. 1 taken on the lines 2—2, 3—3, etc., thereof.
Figure 3:
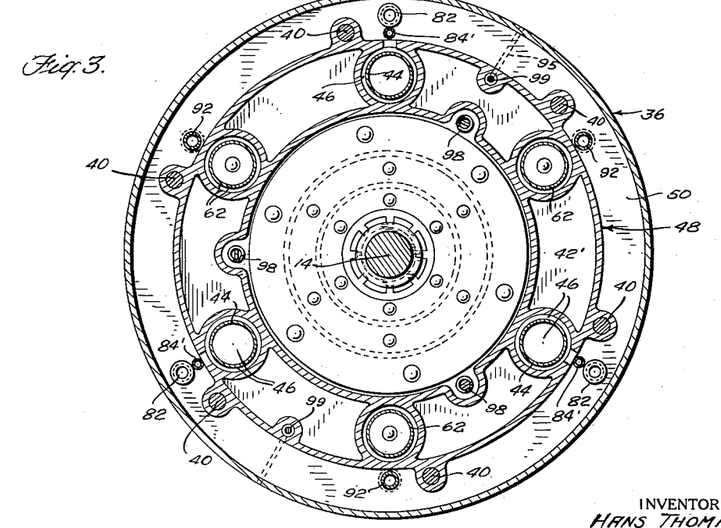
Figure 4:
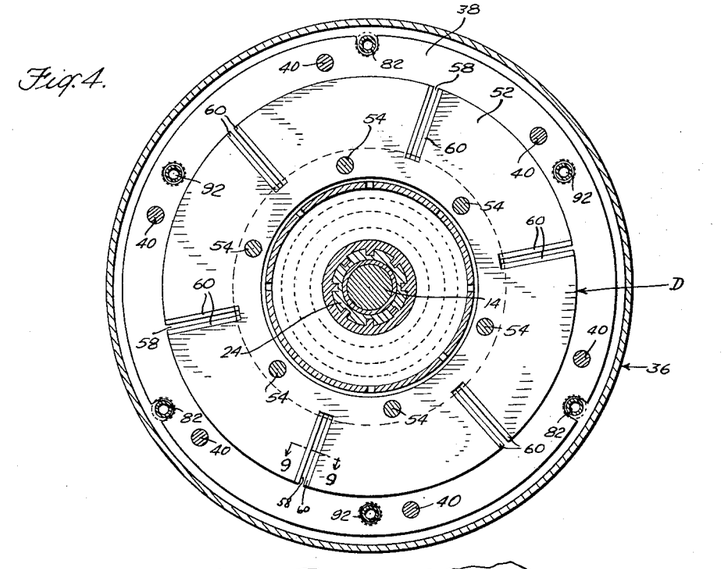

Any suitable number and arrangement of the pistons may be provided but as shown in Figs. 2 and 3, there are three pistons 44 and three pistons 62.

Figure 5:
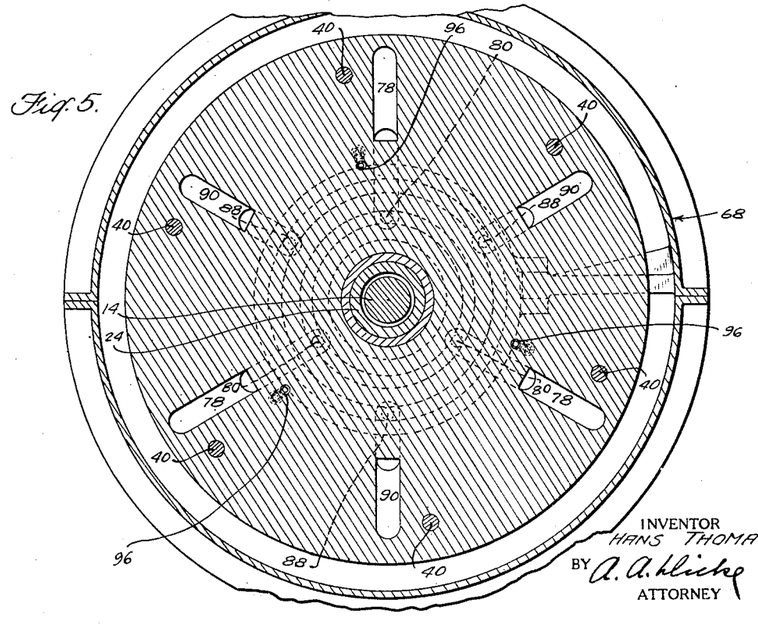
Figure 6:
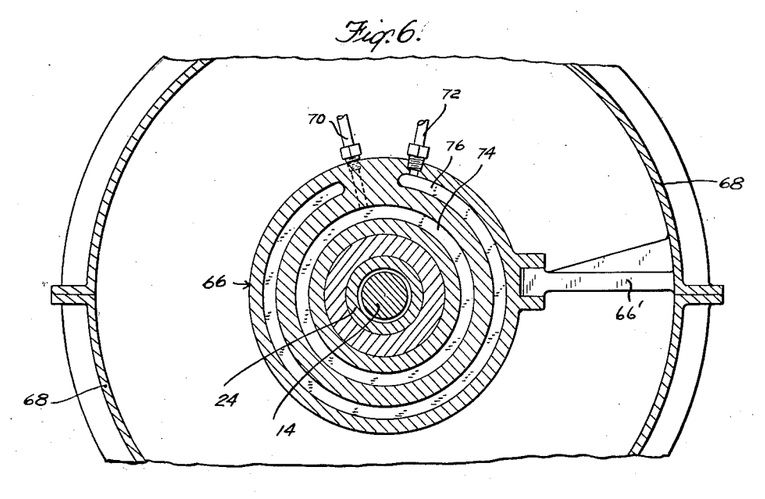
Figure 7:
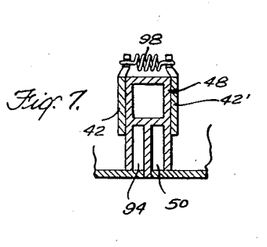
Figs. 7, 8 and 9 are detailed sectional views of certain of the features of the form of clutch mechanism embodied in the construction of Fig. 1.
Figure 8:
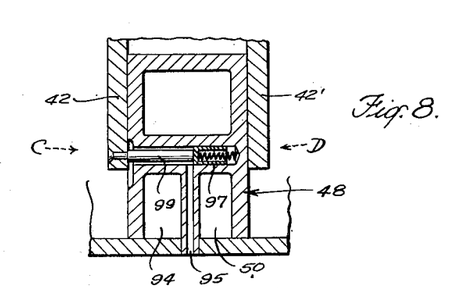
Figure 9:
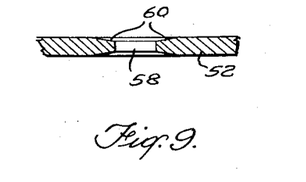

In order to actuate the clutches C and D in a selective manner and supply same with fluid to lubricate and actuate the clutches, I provide a stationary ring 66 secured to the transmission casing 68 in which the mechanism is housed by arm 66' (see Fig. 6). Conduits 70 and 72 are connected to the ring for supplying a fluid such as oil from the lubricating system to annular channels 74 and 76 within the ring. As shown in Fig. 6, the conduit 70 connects with the inner channel 74 for actuating the clutch C, whereas the conduit 72 supplies oil or fluid to the outer channel 76 for actuating clutch D. Referring to Figs. 1 and 5, a channel 78 preferably formed in the wall of the rotatable housing 36 connects with the channel 74 through one or more openings 80 in the outer face of the housing. The passage 78 extends radially to a tubular member 82 passing through slots in the outer edge of the plates 38' of the clutch D. Oil is thus passed to the annular channel or recess 50 in the frame 48 from which it is supplied to chambers 46 for urging pistons 44 to the left as seen in Fig. 1. The plates 38 are thus pressed into frictional engagement with the plates 52 of the clutch C, thereby connecting the intermediate shaft 14 to the power input shaft A so that they rotate together. At the same time oil is passed from the recess 50 through the passages 84 (which are preferably throttling passages of small area) into the space about the plates 38 and 52 so that the surfaces of the plates are lubricated and the cushioning action of the oil between the plates is secured. Part of the oil is forced into slots 58 (Figs. 4 and 9) and by means of beveled edges 60 spread between the coacting surfaces. The plates and casing are rotatable so that oil is supplied to all parts thereof and any excess oil is allowed to pass back into the transmission casing through outlet openings 86.

In a like manner, a fluid or oil for actuating the clutch D is supplied through the conduit 72, annular channel 76, and passages 88 in the outer face of the housing 36, to passages 90 extending radially in the walls of the housing and communicating at their outer end with tubular members 92 which communicate with recess or annular channel 94 within the frame 48 for supplying oil under pressure to the chambers 46' for urging the pistons 62 of the clutch D to the right, whereby the plates 38'- are moved into engagement with the plates 52' and the tubular shaft 24 is caused to rotate with the driving shaft A. Oil is supplied to the spaces about the plates 38' and 52' through throttling passage 84' and the excess thereof passes out of the housing through outlet openings 96.

The rings 42 and 42' of the clutches C and D (see Fig. 7) are drawn toward each other by the springs 98 which urge the rings toward the frame 48 so that when the oil pressure applied to the pistons of either or both clutches is relieved, the springs cause the rings to move back into engagement with the frame 48, and the plates 38 and 38' to be disengaged from plates 52 and 52' to release the clutch. Simultaneously with the disengagement of the clutch plates the oil about the same is discharged from the housing through radially extending passages 95 (see Fig. 8) by movement of a spring pressed closure member 97 which is retracted by a member 99 carried by the ring 42 when the ring moves toward the frame 48. On movement of the ring away from the frame, due to the action of the pistons in causing the clutch plates to become engaged, the closure member 97 is moved into position to close the passages 95 so that oil will be retained in the housing 36. Similar drainage valves are provided for operation by plate 42' for permitting the escape of oil from clutch D.

The clutch construction described has the advantage of smoothness in operation. The oil films produced by the beveled edges of the slots in the plates 52 and 52' serve as a cushion between the plates during relative movement thereof and before the plates are forced into direct contact and serve to transmit torque through shear in the film. The elements of the clutch and of the transmission mechanism are thereby saved from shocks or impacts between relatively moving parts of the mechanism. Furthermore, since the device is continuously supplied with oil or fluid under pressure which flows between the plates and in contact with the surfaces thereof and flows away through the overflow openings 86 and 96, any heat generated by friction or otherwise during operation of the clutch is carried away by the oil and overheating of the elements is thereby avoided.

Figures 10, 11, 12A, 12B, 12C, 12D, 13:
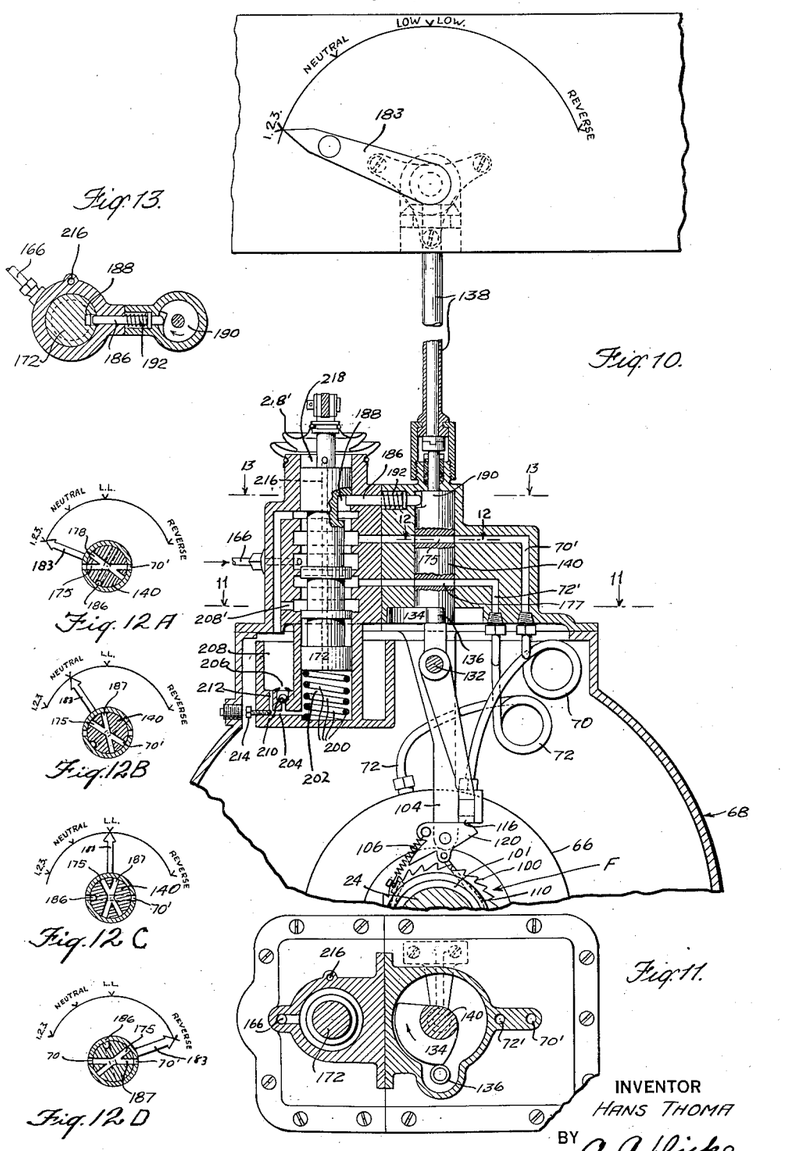
Fig. 10 is a transverse sectional view taken on the line 10—10 of Fig. 1 and showing certain additional features of the construction not illustrated in Fig. 1.
Fig. 11 is a horizontal sectional view of the construction illustrated in Fig. 10 taken on the line 11—11.
Figs. 12A, 12B, 12C, and 12D represent a sectional view taken on the line 12—12 of Fig. 10 with the valve mechanism respectively in four of its possible positions of movement.
Fig. 13 is a horizontal sectional view taken on the line 13—13 of Fig. 10.

In order to effect the desired change in ratio of speed and power between the driving member or power input shaft A and the driven member or power output shaft B, the intermediate shaft 14 and tubular shaft 24 are each provided with one way clutches which serve during normal operation to prevent rotation thereof in a reverse direction. These clutches preferably operate silently and may be a novel type of ratchet construction such as the three alternative constructions illustrated in Figs. 14 and 15, 16 and 17, and 18 and 19. The one way clutch for at times preventing rotation of shaft 14 and housing 16 is generally designated by the letter F and the corresponding mechanism effective upon the tubular shaft 24 is generally designated E. The construction shown in Figs. 14 and 15 is also shown in Figs. 1 and 10 as applied to the intermediate shaft 14 (one way clutch device F) while the construction of Figs. 16 and 17 is shown as applied to the tubular shaft 24 in Fig. 1 (one way clutch device E).

Figures 14, 15, 16, 17:
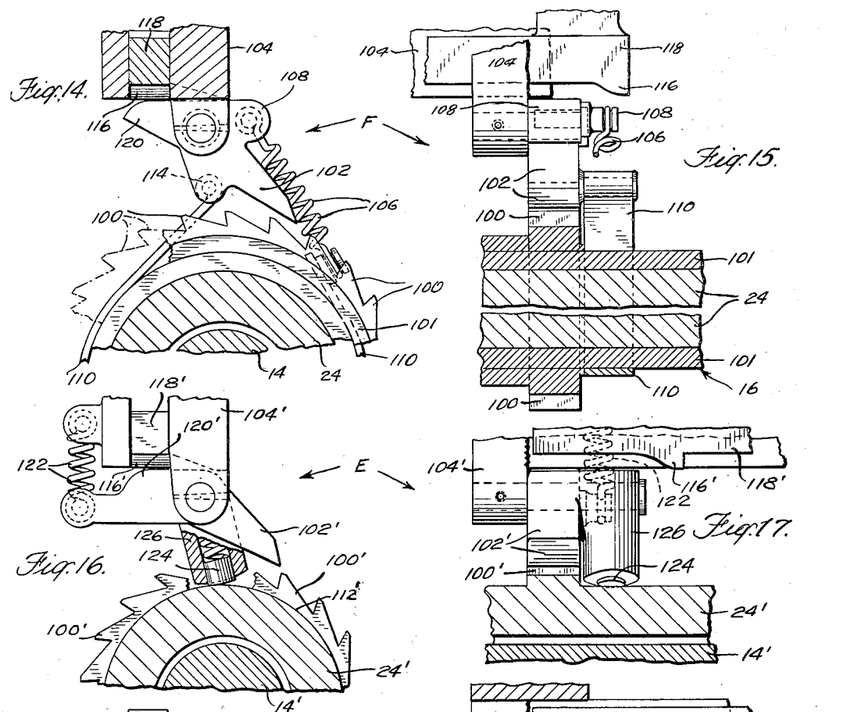
Fig. 14 is a sectional view taken on the line 14—14 of Fig. 1 illustrating a typical form of silent ratchet mechanism adapted for use as a one way clutch.
Fig. 15 is a sectional view of the construction of Fig. 14 taken at right angles to said figure.
Figs. 16 and 17 are sectional views corresponding to Figs. 14 and 15 respectively of alternative forms of silent ratchet mechanism.

In the construction of Figs. 14 and 15 the portion 101 of the housing 16 of shaft 14 is provided with a ratchet member 100 fixedly secured thereto by a rivet, key, or other means. A pawl 102 is pivotally mounted on a support 104 adjacent the ratchet member for engaging the same to prevent rotation of the shaft in a reverse direction. The pawl is normally held in engagement with the ratchet member by a spring 106, one end of which is connected to an arm 108 for holding the pawl in its raised position and other end of which is connected to a friction member such as the band 110 which passes around on the portion 101 and is attached to the pawl 102 at the point 114.

The operation of the device is as follows: On rotation of the shaft 14, housing 16, the portion 101 and the ratchet member 100 in a forward direction, as seen in Fig. 14, the band 110 tends to move with the shaft placing spring 106 under tension and causing the opposite end of the band to raise the pawl by movement of the point 114 to the right. However, when the shaft begins to rotate in a reverse direction or is at rest, the spring 106 contracts, drawing the band 110 and the point 114 to the left so that the pawl engages the ratchet member and prevents further reverse rotation of the shaft.

As hereafter described there are some instances' discussed hereinafter, when it is desirable to permit the shaft 14 to rotate in a reverse direction. In such cases the pawl 102 is held in its raised position as by a projection 116 on a slide 118 which is movable into engagement with a rearwardly extending arm 120 movable with the pawl.

The one way clutch mechanism of Figs. 16 and 17 is applied to the tubular shaft 24 and embodies a similar ratchet member 100', pawl 102', and collar 112'. This mechanism may be of the type shown in Figs. 14 and 15 or any other constructions such as that of Figs. 16 and 17 or 18 and 19. Referring to Figs. 16 and 17, the pawl is normally urged into engagement with the ratchet member by a spring 122 and may be moved out of engagement by a friction member in the form of a spring pressed element 124 movable in a guide in arm 126 which is connected for rotation with the pawl 102'.

The operation of the device is similar to that of Figs. 14 and 15. The element 124 and arm 126 are moved to the right when the shaft 24 rotates in a forward direction raising the pawl 102' and permitting the shaft to rotate freely. However, when the shaft rotates in the reverse direction the spring pressed element 124 which is in engagement with the collar 112' is urged to the left therewith rotating the arm and bringing the pawl 102' into engagement with the ratchet member 100'. In a similar way, the pawl 102' may be held in its raised position by means of a second projection 116' (see Fig. 1) on slide 118 which when moved to the left, as seen in Fig. 17, depresses the arm 120' and holds the pawl out of engagement with the ratchet member.

Figures 18, 19:
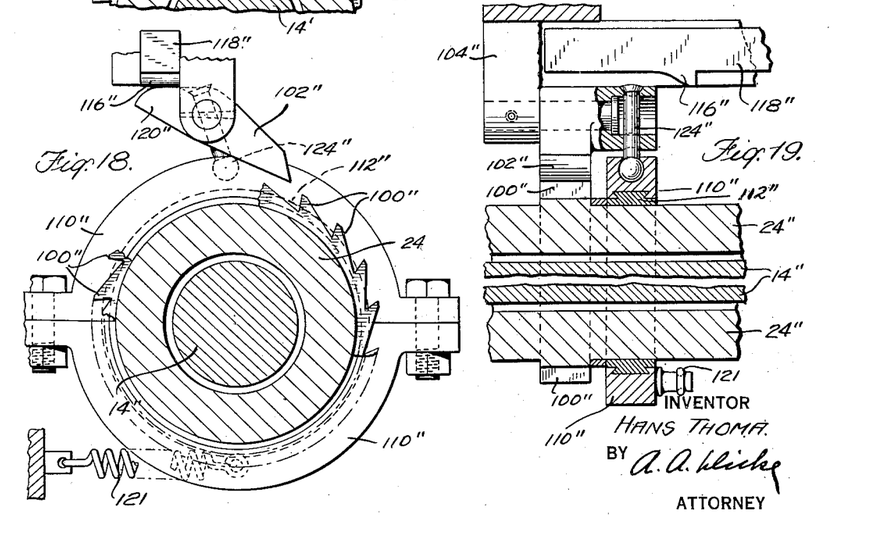
Figs. 18 and 19 are sectional views corresponding to Figs. 14 and 15 respectively of further alternative forms of silent ratchet construction adapted for use in the present invention.

The construction of Figs. 18 and 19 is somewhat similar to that of Figs. 14 and 15 in that the shaft 14" is provided with a ratchet member 100", pawl 102" and collar 112", as well as a band 110" which, when carried by the shaft in a forward direction, causes the pawl to be raised. However, this movement of the band in the construction of Fig. 18 reduces the tension on the spring 121. Rotation of the shaft in a reverse direction then tends to increase the tension on the band so that the band travels with the shaft moving the element 124" to the left and bringing the pawl into engagement with the ratchet member 100". Reverse rotation of the shaft is thus prevented while forward rotation takes place freely. The pawl may be held in its raised position as in the previous constructions by projection 116" on a slide 118" engaging the arm 120" to enable the shaft to rotate freely in a reverse direction.

While the mechanism above described serves to provide a neutral and three forward speeds, the mechanism may also be provided with an extra very low speed (low-low speed) and with a reverse by the use of a member 125 which is loosely mounted on the output shaft B. The member is formed on its left hand end as seen in Fig. 1 with gear teeth 126 which may extend into the housing 16 and mesh with gears 128 which are secured for rotation to the planetary gears 20 and 28. The member 125 is shiftable axially by means of an arm 130 engaging a collar 131 on the right hand end thereof. Lugs 133 are also provided on the member 125 for engagement with internal lugs on web 135 secured to the transmission casing to prevent rotation of member 125 when its gear teeth 126 are moved into engagement with the gears 128 in the housing 16.

The arm 130 may be carried by a slide 132 which also serves to actuate the slide 118 by which the pawl actuating projections 116 and 116' are carried. The slide 132 is moved from one position to another by suitable means such as a rotatable cam 134 shown in Figs. 1 and 11 which engages a roller 136 fixedly secured to the slide for movement therewith. Rotation of the cam 134 is effected by means of a rotatable shaft 138 (Fig. 10) which also serves to operate a control element or plug valve 140 of the hydraulic system by which oil is supplied to the conduits 70 and 72.

Operation

The mechanism described above serves to provide transmission ratios referred to as low, intermediate, direct, low-low, and reverse, and the condition of the clutches C and D, one way clutches E and F, the position of slidable gear member 125, and the gear ratio obtained is shown in the following table:

vented by means such as the one way clutch F as shown in Figs. 14 and 15. The gears 20 which engage the gear 22 on the power output shaft therefore serve to rotate gear 22 and the shaft B forwardly at a low speed.

In low gear the housing 16 is stationary and therefore no planetary action occurs and the output shaft B rotates at one-third the speed of the input shaft A $$\left(i.e. \frac{15}{30} \times \frac{18}{27} = \frac{1}{3}\right).$$

*Intermediate gear ratio.*—When an intermediate speed is desired the clutch D is released and the clutch C is engaged by relieving the pressure on the fluid supplied by conduit 72 and applying pressure to the fluid supplied by conduit 70 through the channels communicating with the chambers 46 within which the pistons 44 of the clutch C are located. The clutch C is thus engaged and the clutch D released. The intermediate shaft 14 is thus caused to rotate with the power input shaft A and the housing 36. The housing 16 and planetary gears 20 are also rotated with the power input shaft and shaft 14 in a forward direction. The one way clutch device E serves to prevent reverse rotation of the tubular shaft 24 and gear 26 and the power output shaft B will therefore be driven through the planetary gears 20 and the gear 22 on the left hand end of the power output shaft. With the number of teeth in the various gears as given above the gear ratio between the input shaft and the output shaft will be 1½ to 1.

*Direct gear.*—In order to provide a high speed or direct drive both the clutches C and D are engaged so that shafts 14 and 24 both rotate with the housing 36 and the power input shaft A. The planetary gears 20 are therefore held stationary upon their shafts and the gear 22 on the

|  | Clutches | One way clutches | Slidable member 125 | Ratio |
|---|---|---|---|---|
| Neutral | C & D free | | | 0 |
| Low | C free / D effective | F effective / E held out by friction device | Ineffective | 3 to 1 |
| Intermediate | C effective / D free | E effective / F held out by friction device | Ineffective | 1½ to 1 |
| Direct | C effective / D effective | E held out by friction device / F held out by friction device | Ineffective | 1 to 1 |
| Low-low | C effective / D free | E held out by lug on slide / F held out by lug on slide | Effective | 4.2 to 1 |
| Reverse | C free / D effective | E held out by lug on slide / F held out by slide | Effective | 5.4 to 1 (reversely) |

(The drive ratios given above are on the assumption that gear 26 has 15 teeth, gear 28 has 30 teeth, gear 20 has 18 teeth, gear 22 has 27 teeth, gear 128 has 21 teeth, and gear 126 has 24 teeth.)

*Neutral.*—When clutches C and D are not actuated no energy can be transmitted and the device is in neutral position irrespective of the adjustment of the one way clutches E and F or the slidable gear member 125.

*Low gear ratio.*—When low forward speed is desired, the clutch D is engaged by supplying oil under pressure to the conduit 72, channels 76, passage 90 and tubular member 92 to the piston 62 within the chamber 46'. The plates 52' of the clutch member are thus urged into engagement with the plates 38' of the clutch member and the tubular shaft 24 is therefore gradually caused to rotate with the input shaft A and housing 36. The gear 26 is thus rotated, driving the gears 28 and gears 20 on shafts 18. Reverse rotation of the shaft 14 and housing 16 is prepower output shaft is driven thereby at the same speed as the power input shaft, thus giving a one to one ratio. It will be noted that in direct gear ratio none of the gears moves relative to other gears.

*Low-low gear ratio.*—For certain purposes it may be desirable to provide an additional very low speed with a very high torque (low-low gear) and for this purpose I employ the slidable member 125 which surrounds the power output shaft B. This member is as described hereinabove moved into engagement with the gears 128 by means of the arm 130 actuated by slide 132 upon rotation of the cam 134 and shaft 138 (Figs. 1 and 10). The gears 128 therefore rotate with the planetary gears 20 while the gear teeth 126 of member 125 are held against rotation by the lugs 133 engaging the web 135 secured to the transmission casing. The movement of the slide 132 also serves to carry the slide 118 and the projections 116 and 116' forwardly into engagement with the arms 120 on both of the pawls 102 and 102' of the one way clutch devices E and F which are normally applied to the shafts 14 and 24. These shafts are therefore free to rotate rearwardly. In order to procure the low-low gear ratio the clutch C is energized whereas the clutch D remains disengaged.

With this arrangement of the elements the power input shaft which rotates forwardly carries the intermediate shaft 14, housing 16, and planetary gears 20 therewith at the same speed. The gear teeth 126 which engage gear 128 are locked against rotation as described above, so that the planetary gear 128 rolls around the gear teeth 126 while the gear 20 rolls around the gear 22 on the output shaft. Due to the difference in number of teeth 126 on the member 125 and the gear 22, power is applied to the output shaft in a forward direction at a greatly reduced speed (4.2 to 1).

During the operation above described, the gear 28 causes gear 26 and the tubular shaft 24 to rotate in the reverse direction which is permitted since the pawl 102' is held in its raised ineffective position by lug 116'.

*Reverse.*—In providing reverse with the mechanism described the clutch C is released and the clutch D is engaged. The cam 134 and shaft 138 have been previously suitably rotated by movement of hand lever 183 to bring the gear teeth 126 into engagement with the gear 128 within the housing 16 and to release the one way clutch devices E and F applied to shafts 14 and 24 to allow reverse rotation thereof. The shaft 24 and gear 26 are thus carried in a forward direction while the gear teeth 126 remain stationary causing the planetary gears to rotate upon their shafts 18, the gears 128 being caused to roll about the gear teeth 126, driving the power output shaft in the reverse direction at the low gear ratio of 5.4 to 1. The housing 16 and shaft 14 are also driven in the reverse direction but since the one way clutch F is held disengaged the parts can rotate without interference.

In the construction of Fig. 1 the mechanism is also provided with a hydraulically actuated brake shown at the right hand side of Fig. 1. The brake is shown as similar in form and construction to the clutch devices C and D. Plates 142 are carried by bolts 143 and cooperate with a ring 144 non-rotatably supported by the transmission casing 68 but movable axially by pistons 146 to engage plates 148 carried by a web 150 secured to and rotatable with the power output shaft B. Operation of the brake is effected by supplying oil or other fluid under pressure through the line 152 to the annular channel 154 under the control of a foot operated member 156 shown in Fig. 20. The brake functions in the same manner as the clutches C and D to bring the plates 142 smoothly into frictional engagement and direct contact with the plates 148 rotatable with the output shaft. The braking force is applied over a very large area spaced a substantial distance from the axis of rotation so that effective braking action is obtained even when relatively low pressure is exerted by the oil supplied to the mechanism. While the brake is being used a certain amount of oil is permitted to flow through opening 146' from the actuating cylinders to the brake plates and thence back into the sump, which oil serves to carry away the heat generated during the braking operation.

Figure 20:
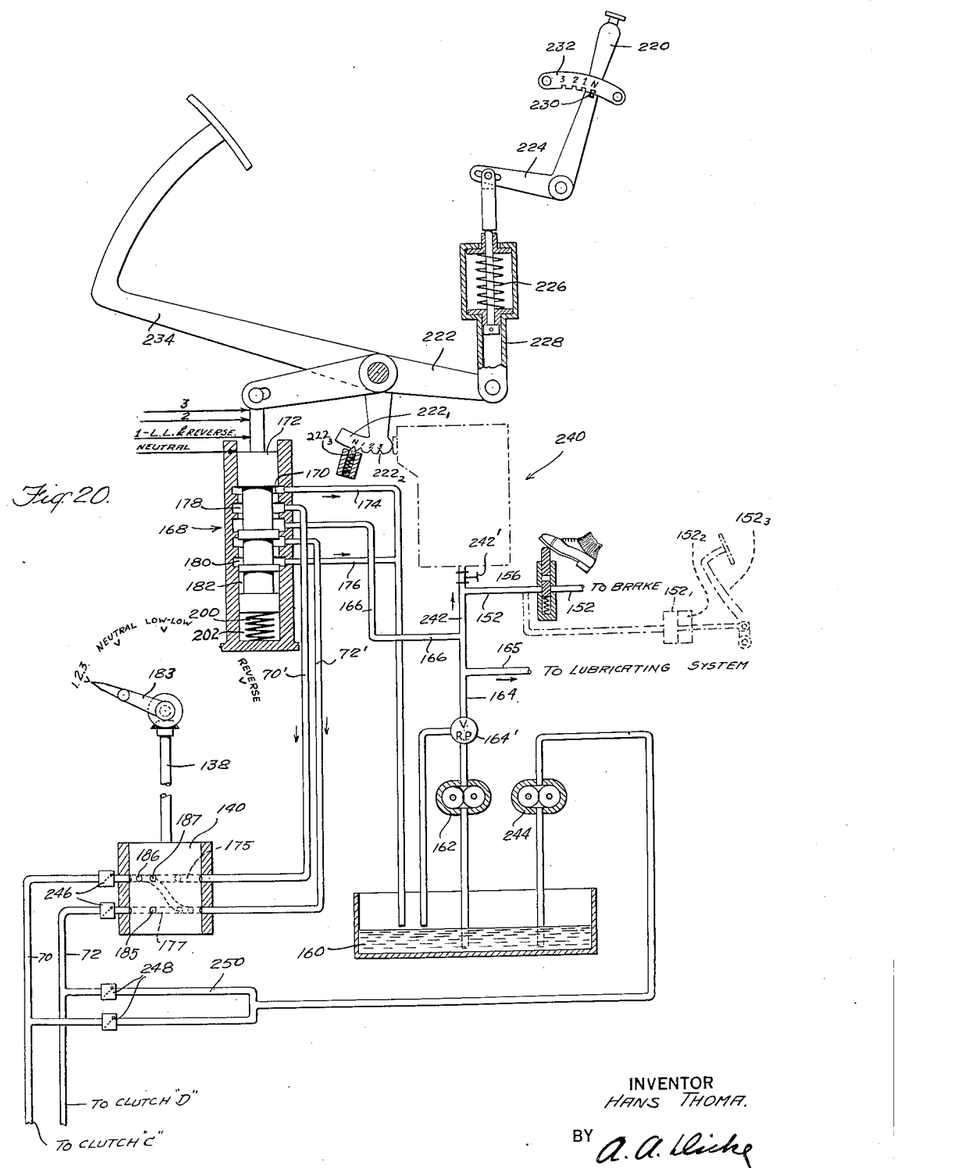
Fig. 20 is a diagrammatic illustration partly in elevation of a typical arrangement of hydraulic control mechanism for actuating a change speed transmission of the type illustrated in Fig. 1.

The same clutch arrangement can be utilized as a manually operated as distinguished from a manually controlled brake by the construction shown in dotted lines in Fig. 20 wherein 151₁ is a cylinder within which operates the piston 152₂ operated by the foot pedal 152₃. When this construction is used the openings 146' are preferably omitted.

The mechanism employed for supplying oil under pressure to the clutch mechanism and to other elements of the device may be of any suitable character or design, but, as illustrated in Figs. 20 to 25 inclusive, the flow of oil under pressure may be readily controlled by a valve operable to selectively supply the oil as desired. In the construction shown in Fig. 20, oil is drawn from a sump 160 by means of a gear pump or the like 162 and is supplied under pressure through a pipe 164 to a supply line 166. A relief valve 164' is preferably utilized to prevent excessive pressure under certain conditions. The pump 162 may be the same as that used to supply oil for lubrication to the engine or other device and for this purpose a pipe 165 is provided which communicates with the pipe 164 and extends to the usual lubricating system.

The supply line 166 leads to a valve 168 provided with a chamber 170 within which a valve member 172 is slidable. The inner face of the chamber is provided with suitable ports to which are connected the supply line 166, relief lines 174 and 176, and pressure lines 70' and 72' which extend through passages 175 and 177 in the control element 140 to the conduits 70 and 72 for actuating the clutches C and D. The valve is formed with three recessed portions 178, 180, and 182 which, on movement of the valve, serve to provide communication between the various ports to which the supply line 166, pressure lines 70' and 72', and relief lines 174 and 176 are connected.

Figures 21, 22, 23:
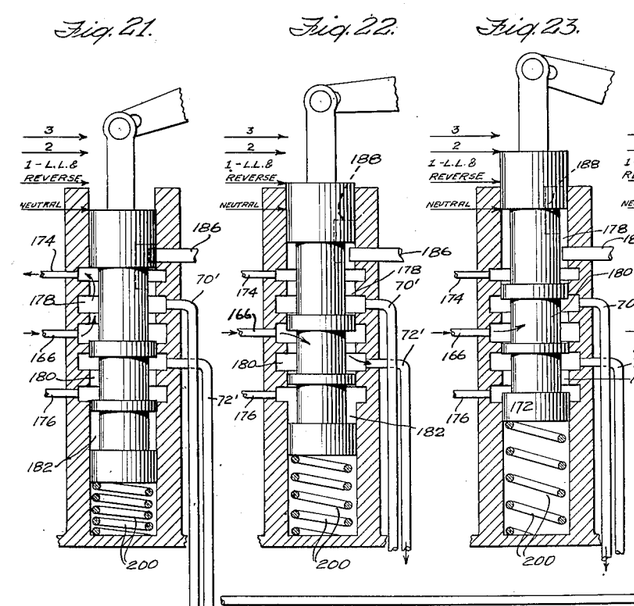
Figs. 21 to 24 inclusive illustrate alternative positions of the valve mechanism shown in Fig. 20 for use in controlling the mechanism of Fig. 1.

As illustrated in Figs. 20 and 21, the valve 172 is in its lowermost or neutral position whereby oil under pressure is passed by the supply line to the valve chamber 170. The upper recess 178 provides communication between the supply line and the ports to which the relief line 174 and pressure line 70' are connected. Therefore, since the relief line 174 is not sealed, oil flows freely through the chamber 170 to the relief line 174 and back to the sump and pressure is not applied to the pressure line 70'. The clutches therefore are not actuated and the transmission remains disengaged or in "neutral".

When the valve 172 is moved upward to the position of Fig. 22 the supply line 166 is brought into communication with the pressure line 72' by the recess 180 in the valve so that oil under pressure passes directly to the pressure line and thence through the control element 140 to the pipe 72 and the clutch D. The clutch D is therefore actuated and the tubular shaft 24 is caused to rotate with the power input shaft A to drive the power output shaft in low gear.

When the slide 172 is raised to the position shown in Fig. 23 the recess 180 thereof provides communication between the supply line 166 and pressure line 70' so that oil under pressure is supplied through control element 140 to the conduit 70 for actuating the clutch C. At the same time the pressure line 72' is brought into communication with the relief line 176 by the recess 182 so that the pressure on conduit 72 is relieved. When in this position the clutch C is brought into engagement whereas the clutch D is released and the power output shaft is therefore driven at intermediate speed as described more fully above.

Figures 24, 26:
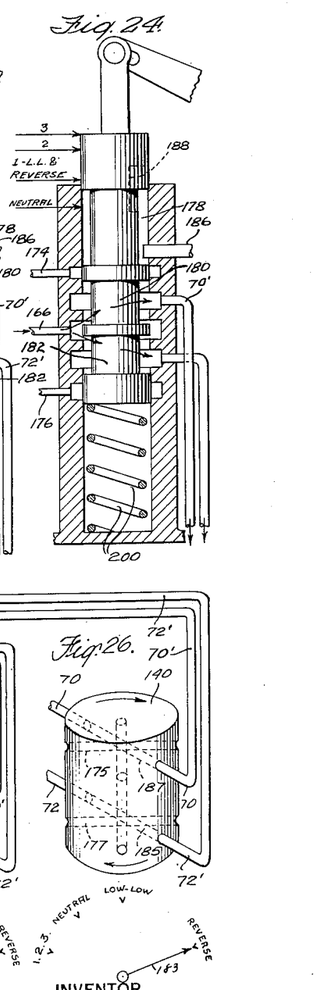
Figs. 25 and 26 are diagrammatic illustrations of additional elements of the hydraulic system in various alternative positions.

When the valve 172 is raised to its uppermost position as shown in Fig. 24, oil under pressure from supply line 166 is passed to both of the pressure lines 70' and 72' through the recesses 180 and 182 of the valve so that both of the clutches C and D are actuated and shafts 14 and 24 are both connected to the power input shaft to drive the power output shaft at high speed as described above.

During each of the above operations the control member 140 is retained in the position shown in Fig. 21 wherein oil passes therethrough directly from the pressure lines 70' and 72' to the conduits 70 and 72 respectively, which communicate with the clutch mechanisms. The control element is brought to this position by movement of the indicating handle 183 (Figs. 10 and 20) into the position marked 1, 2, 3, with the resulting rotation of shaft 138 and control element 140 to the position shown in Figs. 10, 12A, 20, and 21. At the same time the cam 134 which is actuated by shaft 138 is in the position shown in Fig. 11 in which the slide 132 is held in its retracted or right hand position as shown in Fig. 1 against the action of spring 184 and the one way clutch devices associated with shafts 14 and 24 are rendered operative.

To provide a neutral position, setting lever 183 is moved to the position designated "neutral" in Figs. 10 and 20 whereupon the valve 140 will take the position shown in Fig. 12B wherein all communication from conduits 70' and 72' within conduits 70 and 72 is prevented.

Figure 25:
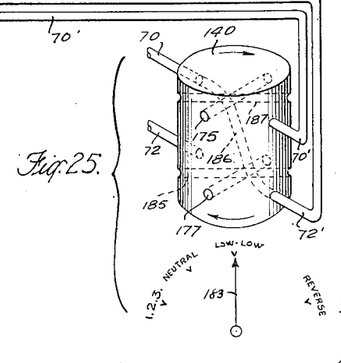

When it is desired to use the extra low gear ratio which, as described above, is effected by shifting the gear teeth 126 into engagement with the gears 128 within housing 16, the indicating handle 183 is rotated to the central position shown in Figs. 10 and 20 with the result that the control member 140 is rotated to the position shown in Fig. 25 and in Fig. 12C and cam 134 is rotated by shaft 138 to permit the slide 132 to move to the left as seen in Fig. 1 under the action of spring 184, and the projections 116 and 116' serve to render the one way clutch devices inoperative. The valve 172 is then allowed to move to the low gear position of Fig. 22. The resulting pressure in line 72' which normally communicates with the conduit 72 is now communicated instead to the conduit 70 so that while the valve slide is in the position shown in Fig. 22, oil for actuating the clutch C is passed from the pressure line 72' through a passage 186 in the control member to the conduit 70.

In order to drive the power output shaft in reverse, the indicating handle 182 is moved into the extreme right hand position so as to rotate the control element 140 to the position shown in Fig. 26 and in Fig. 12D while the cam 134 still permits the slide 132 to remain in the left hand position. Upon movement of valve 172 to the low gear position (Fig. 22) oil under pressure is then supplied from conduit 72' to the conduit 72 for actuating clutch D through the passage 185 in control element 140.

While the mechanism is in either the low-low gear ratio or reverse, the valve 172 is prevented from rising above the position of Fig. 22, said control being effected by the rotation of control element 140. This may be accomplished by means of a pin 186 (Figs. 10, 13 and 22) which is moved into a slot 188 in the valve by means of a cam 190 carried by or movable with the element 140. Normally, the pin 186 is held retracted by spring 192 so that the valve 172 is free to move to any of its various positions. However, when the arm 182 is moved to either the low-low position or to reverse, the shaft 138 is rotated causing cam 190 to move pin 186 into slot 188 so that while the valve can be moved downward to the neutral position of Figs. 10 and 21 it cannot rise above the position of Fig. 22 in which it is located when the mechanism is operating in low, low-low, or reverse.

The means employed for moving valve 172 up and down to effect the control of the clutch members may be of any suitable design and character. However, as shown in Figs. 10 and 20 the valve may be urged upwardly by a spring 200 located in a chamber 202 beneath the valve. The chamber 202 which serves as a dashpot may be formed with a passage 204 near the bottom thereof which communicates with a relatively large check valve controlled passage 206 opening into an open top oil reservoir 208 which is supplied with oil as by drainage through opening 208' (Fig. 10). When the valve 172 is depressed, oil flows freely from beneath the valve through the passage 206, past the ball 210 into the reservoir 208 and a part thereof may overflow into the transmission housing. A second smaller passage 212 extends from reservoir 208 to the passage 204 so that oil may flow slowly back into the chamber 202 when the spring urges the valve upward. The rate of flow of oil through the passage 212 may be regulated as necessary by means of the adjusting screw 214. A passage 216 may also be provided communicating with the space 218 above the valve to permit oil to flow into and out of said space as the valve moves up and down. Space 218 may be closed by means of a bellows 218' of suitable material.

The valve may be moved downward against the action of spring 200 by a hand lever 220, shown in Fig. 20, which serves to raise the right hand end of the pivoted arm 222 and depress the left hand end thereof to which the valve 172 is connected. A spring biased lost motion connection is provided between the bell crank 224 connected to hand lever 220 and the pivoted arm 222. The construction embodies a spring 226 which is compressed by movement of the lever 220 to the left as shown in Fig. 20 whereby the spring serves to force the link 228 and the right hand end of the pivoted arm 222 downward to raise the left hand end thereof with the valve 172. The hand lever may be set for any desired gear ratio by a catch 230 engaging a rack segment 232 so as to hold the mechanism in neutral, low, or intermediate speed if necessary.

A foot pedal 234 may be used in place of or supplemental to the hand lever 220 for operating the valve 172. Preferably connected for movement with the lever 222 and foot pedal 234, is a segment 222₁ having a suitable number of depressions 222₂ therein receiving a spring pressed detent 222₃ to permit the operator to more readily keep the valve 172 in one of its definite positions of adjustment.

In case it is desired to adjust the mechanism to direct gear when the engine is not running as when the car is pushed to start the motor because of a battery failure, it may be desired to use a hand operated or other auxiliary pump 244 to supply oil under pressure to the conduits 70 and 72. For this purpose check valves 246 are provided to prevent oil passing back through the pressure lines 70' and 72'. It is also necessary to provide check valves 248 in the lines 250 extending from the hand pump 244 to the conduits 70 and 72 to prevent loss of oil pressure by flow outward therethrough during normal operation of the mechanism. Oil under pressure may therefore be supplied at will to operate the clutch mechanism when the pump 162 is not operating.

If desired the mechanism may be actuated by any suitable automatic control device such as that shown and described in my copending application Serial No. 747,833 filed October 11, 1934. Such a device is indicated generally at 240 in Fig. 20 and is supplied with oil under pressure from the pump 162 through the line 242 for operating the same, a shut off valve 242' being furnished, if desired, to disable the automatic control device. Said device will, of course, include some pressure controlled device acting upon the valve 172 as by pressing against the right end of the segment 222₁ of Fig. 20.

The operation of the valve operating mechanism will be apparent from the foregoing description thereof. The valve 172 is moved into neutral position as shown in Figs. 10 and 21 by means of the hand lever 220, the foot pedal 234 or other suitable control device. If the hand lever 220 and its associated parts are used the spring 226 is made of such strength and the parts are so proportioned that it can overcome the effect of spring 200 when the lever is in the position shown in Fig. 20 but when in one of the other positions spring 200 can move the valve 172 to the corresponding position. Upon release of the foot pedal when the hand lever is set to the position 1 (Fig. 20) the spring 200 may force the valve 172 upwardly. However, the dashpot construction at the bottom of valve 172 (Fig. 10) renders the upward movement as slow as desired so that the device passes gradually from neutral to low, low to intermediate and then to direct with sufficient delay between the transition from one to the other to allow the parts to attain the necessary speed to prevent overloading or stalling of the motor. By this means a "semi-automatic" operation is made possible in that the only act required of the operator in starting the car forward is the release (sudden, if desired) of the foot pedal 234, whereupon the transmission will be gradually adjusted for "low," "intermediate" and "direct" without further attention. The rate of valve movement is, of course, so adjusted that the motor can under normal conditions (as on level ground) accelerate the car sufficiently during the time the transmission is in low or intermediate gear ratio to be able to accelerate the car further in the next higher ratio.

It will be noted that the change over from one ratio to another occurs without interrupting the flow of power from the motor to the drive wheels of the car to which the shaft B is of course connected.

While the automatic transmission heretofore described is shown in association with an automobile, it will be understood that the same is adapted for other uses and purposes; and while, for the sake of clearness, only certain expressions of the inventive idea have been illustrated and described in detail, it is to be understood that the invention is not limited thereto, but that the inventive idea is susceptible of various mechanical expressions within the limits of the appended claims, and that certain features thereof may be used alone or in combination with other known or suitable devices.

What is claimed is:

1. In an energy transmission device, a power input member and a power output member, two intermediate members, means for connecting at will either or both of said intermediate members to said power input member, a sun gear connected to one of said intermediate members, a second sun gear connected to said output member, a planetary arm connected for operation by said other intermediate member and serving to carry three connected planetary gears two of which mesh respectively with said sun gears and the third of which meshes with a stationary sun gear and means for disengaging said stationary sun gear from its planetary gear.

2. In an energy transmission device, a power input member and a power output member, two intermediate members, means for connecting at will either or both of said intermediate members to said power input member, a sun gear connected to one of said intermediate members, a second sun gear connected to said output member, a planetary arm connected for operation by said other intermediate member and serving to carry three connected planetary gears two of which mesh respectively with said sun gears and the third of which meshes with a stationary sun gear and means for freeing said third planetary gear from the control of said stationary sun gear.

3. An energy transmission device comprising a power input shaft, a power output shaft, a plurality of alternatively operable connections between said input and output shafts and selectively operable, and hydraulically actuated means for effecting the desired connection between said input and output shafts comprising a source of fluid pressure and a valve for connecting said source at will with either or both of said hydraulically actuated means, a second valve or modifying the effect of said first mentioned means and means made effective as an incident to the setting of said second valve to control the extent of movement of said first mentioned valve.

4. In an energy transmission device, a power input member and a power output member, two intermediate members, means for connecting at will either or both of said intermediate members to said power input member, a sun gear connected to one of said intermediate members, a second sun gear connected to said output member, a planetary arm connected for operation by said other intermediate member and serving to carry three connected planetary gears two of which mesh respectively with said sun gears and the third of which meshes with a stationary sun gear and means for disengaging said stationary sun gear from its planetary gear, means normally preventing reverse rotation of said intermediate members and means for disabling said preventing means when said stationary sun gear is engaged with said third planetary gear.

5. An energy transmission device comprising a rotatably mounted power input member, a power output member, an intermediate shaft having means at one end for clutching it at will to said power input member and connected at the other end to an arm member of a planetary gearing, an intermediate tubular member surrounding said intermediate shaft and having means at one end for clutching it at will to said power input member and connected at its other end to a sun gear of said planetary gearing, two planetary gears connected together and carried by said planetary arm, one of said planetary gears meshing with said sun gear and the other meshing with a sun gear on the power output member.

6. The combination set forth in claim 5 together with means effective at will for preventing reverse rotation of said planetary arm and/or said tubular member.

7. The combination set forth in claim 5 together with means effective at will for preventing reverse rotation of said planetary arm and/or said tubular member, and means for at will making either or both of said clutching means effective.

8. An energy transmission device comprising a rotatably mounted power input member, a power output member, a planetary gearing comprising a planetary arm, two connected gears carried thereby and two sun gears meshing with said planetary gears, an intermediate shaft having means at one end for clutching it at will to said power input member, an intermediate tubular member surrounding said intermediate shaft and having means at one end for clutching it at will to said power input member, one of said sun gears being connected with said power output member and the other sun gear for rotation with one of said intermediate members and the planetary arm being connected for rotation with the other intermediate member.

9. The combination set forth in claim 8 together with means for at will making either or both of said clutching means effective.

10. The combination set forth in claim 5 together with means for at will making either or both of said clutching means effective.

HANS THOMA.